(12) United States Patent
Kadoya et al.

(10) Patent No.: US 9,696,501 B2
(45) Date of Patent: Jul. 4, 2017

(54) FIBER COUPLING MODULE

(71) Applicant: SHIMADZU CORPORATION, Nakagyo-ku, Kyoto-shi, Kyoto (JP)

(72) Inventors: Akiyuki Kadoya, Kyoto (JP); Koji Tojo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/311,874

(22) PCT Filed: Jun. 12, 2014

(86) PCT No.: PCT/JP2014/065636
§ 371 (c)(1),
(2) Date: Nov. 17, 2016

(87) PCT Pub. No.: WO2015/189965
PCT Pub. Date: Dec. 17, 2015

(65) Prior Publication Data
US 2017/0082811 A1    Mar. 23, 2017

(51) Int. Cl.
*G02B 6/36*    (2006.01)
*G02B 6/38*    (2006.01)
(Continued)

(52) U.S. Cl.
CPC ........... *G02B 6/385* (2013.01); *G02B 6/3843* (2013.01); *G02B 6/3895* (2013.01); *G02B 6/42* (2013.01);
(Continued)

(58) Field of Classification Search
None
See application file for complete search history.

(56) References Cited

U.S. PATENT DOCUMENTS 6,652,151 B2 * 11/2003 Sato ..................... G02B 6/385
385/53
8,111,956 B2 * 2/2012 Tan ..................... G01M 11/088
385/24
(Continued)

FOREIGN PATENT DOCUMENTS

JP    2007-214614    8/2007
JP    Z2007214614    8/2007
(Continued)

OTHER PUBLICATIONS

PCT/JP2014/065636, International Preliinary Report on Patentability and Written Opinion, mailed Dec. 15, 2016, 5 pages—English.
(Continued)

*Primary Examiner* — Rhonda Peace
(74) *Attorney, Agent, or Firm* — Andrew F. Young, Esq.; Lackenbach Siegel, LLP (57) ABSTRACT

A fiber coupling module comprises an optical fiber connector detachable from an optical fiber cable, wherein an end surface of the optical fiber cable is treated with an anti-reflection coat to set the reflectance lower than a predetermined value relative to the light of a first wavelength band and to set the reflectance higher than a predetermined value relative to the light of a second wavelength band excluding the first wavelength band, and the fiber coupling module connects to the optical fiber cable through said optical fiber connector. A main light source outputs the light of the first wavelength band to the optical fiber cable. An aiming light source outputs the light of the second wavelength band to the optical fiber cable. A detection element that detects the connection status of the optical fiber cable to the optical fiber connector based on the light of the second wavelength band reflected from the end surface of the optical fiber cable.

9 Claims, 5 Drawing Sheets

(51) Int. Cl.
*G02B 6/42* (2006.01)
*G01M 11/08* (2006.01)
(52) U.S. Cl.
CPC ......... *G02B 6/4208* (2013.01); *G02B 6/4257* (2013.01); *G02B 6/4286* (2013.01); *G02B 6/4292* (2013.01); *G01M 11/088* (2013.01)

(56) References Cited

U.S. PATENT DOCUMENTS

| | | | |
|---|---|---|---|
| 8,767,064 B2* | 7/2014 | Koreeda | G02B 6/3843 348/95 |
| 9,110,251 B2* | 8/2015 | Chen | G01N 21/958 |
| 2016/0170151 A1* | 6/2016 | Baribault | G02B 6/385 356/73.1 |
| 2016/0313211 A1* | 10/2016 | Higuchi | G01M 11/088 |
| 2016/0320565 A1* | 11/2016 | Brown | G02B 6/385 |
| 2017/0082811 A1* | 3/2017 | Kadoya | G02B 6/42 |

FOREIGN PATENT DOCUMENTS

| | | |
|---|---|---|
| JP | 2013036826 | 2/2013 |
| JP | 2013-36826 | 9/2014 |

OTHER PUBLICATIONS

PCT/JP2014/065636, International Search Report and Written Opinion dated Mach 3, 2015, 6 pages—Japanese, 3 pages—English.

* cited by examiner

FIBER COUPLING MODULE

CROSS REFERENCE TO RELATED APPLICATIONS

This application relates to and claims priority from PCT Ser. No.: PCT/JP2014/065636 filed Jun. 12, 2014, the entire contents of which are incorporated herein by reference.

FIGURE SELECTED FOR PUBLICATION

FIG. 1

BACKGROUND OF THE INVENTION

Field of the Invention

The present invention relates to a fiber coupling module comprising an optical fiber connector that a user thereof can attach and detach.

Description of the Related Art

Conventionally, a method of monitoring unconnection (e.g., a bad connection) of an optical fiber to an optical fiber connector is known. For example, it is disclosed that a change of output power of a photo-detection sensor due to existence or non-existence of the optical fiber connector is monitored by using a light source of the light emission diode (LED) or a laser diode (LD) (Patent Document 1).

Or a laser light absorption medium is in-place in the rear side of the optical fiber connector and the condition of the optical fiber is monitored with the temperature rising of the light absorption medium in-place on the light axis interlocked with such as a shutter and so forth when the optical fiber is unconnected to the optical fiber cable.

In addition, in Patent Document 2, it is disclosed that a reflected light from the side face of the optical fiber is received and connection of the optical fiber is detected based on the received light power therefrom.

It is necessary to monitor the connection status of an optical fiber cable from safety standpoint in association with a fiber coupling module that connects the high-power output laser light, which is applied to machining or medical treatment, to the optical fiber cable, when the optical fiber cable has a detachable optical fiber connector.

PRIOR ART

Patent Document

JP 2013-36826 A1
JP 2007-214614 A1

ASPECTS AND SUMMARY OF THE INVENTION

Problems to be Solved by the Invention

However, according to the prior art, the connection status of the optical fiber cable is being monitored outside a fiber coupling module. Therefore, such as a sensor and so forth is in-place in the proximity of the optical fiber connector, so that a cost-up due to an operational difficulty, growing in size of the device and complication thereof takes place.

In addition, if an optical system of the monitoring system is in-place on the light axis of the high-power output laser light, the properties such as wavelength and power-output of both of the laser light source and the optical system of the monitoring system must be considered.

The purpose of the present invention is to provide a fiber coupling module that can monitor the connection status of the optical fiber cable inside the module, wherein the optical fiber cable has a detachable optical fiber connector.

Means for Solving the Problem

To solve the above problems, a fiber coupling module according to the present invention comprises: an optical fiber connector detachable from an optical fiber cable, of which the face is treated with an anti-reflection coat to set the reflectance, relative to the light of the first wavelength band, lower than a predetermined value and to set the reflectance, relative to the light of second wavelength band excluding the first wavelength band, higher than a predetermined value, wherein the fiber coupling module connects the optical fiber cable through the optical fiber connector, a main light source that outputs the light of the first wavelength band to the optical fiber cable; an aiming light source that outputs the light of said second wavelength band to said optical fiber cable; a detection element that detects the connection status of the optical fiber cable to the optical fiber connector based on the light of the second wavelength band reflected from the face of the optical fiber cable Effect of the Invention According to the present invention, the light of the second wavelength band from the aiming light source is reflected at the anti-reflection coat by using the anti-reflection coat treated on the end surface of the optical fiber cable and the detection element detects the connection status between the optical fiber cable and the optical fiber connector based on the light of the second wavelength band. Accordingly, the connection status of the optical fiber cable is being monitored even inside the fiber coupling module having the optical fiber connector.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Hereinafter, referring to FIGs., the inventor sets forth further detail of a fiber coupling module according to the aspect of the Embodiment of the present invention.

Embodiment 1

Figure 1:
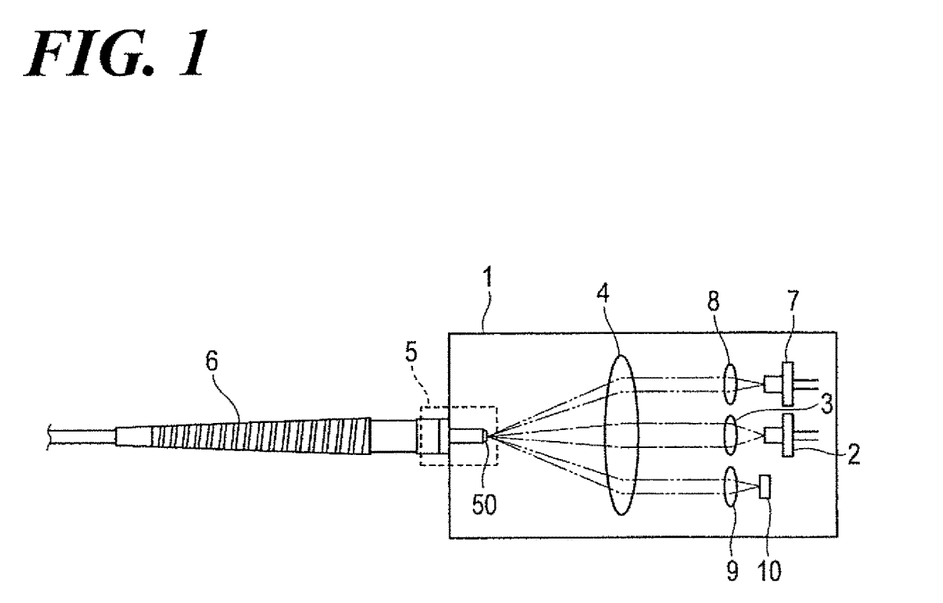
FIG. 1 is a diagram illustrating the structure of a fiber coupling module according to the aspect of the Embodiment 1 of the present invention.

Referring to FIG. 1, a fiber coupling module according to the aspect of the Embodiment 1 of the present invention includes a laser head 1. Such laser head 1 comprises a semiconductor laser 2, a collimate lens 3, a focus lens 4, an optical fiber connector 5, an aiming light source 7, a collimate lens 8, a focus lens 9 and a sensor 10.

The semiconductor laser 2 corresponds to the main light source of the present invention and outputs a first wavelength band laser light. The collimate lens 3 makes the laser lights from the semiconductor laser 2 parallel. The focus lens 4 converges the parallel lights from the collimate lens 3. The laser head 1 is connected to the optical fiber cable 6 through the optical fiber connector 5. The optical fiber cable 6 can be detached from the optical fiber connector 5.

Anti-reflection coat (AR coat) 50, which sets the reflectance relative to the light of the first wavelength band of the semiconductor laser 2 smaller than the predetermined value (e.g., 0.2%) and sets the reflectance relative to the light of the second wavelength band excluding the light of the first wavelength band not less than the predetermined value (e.g., 90%), is treated on the end surface of the optical fiber of the optical fiber cable 6.

Figure 2:
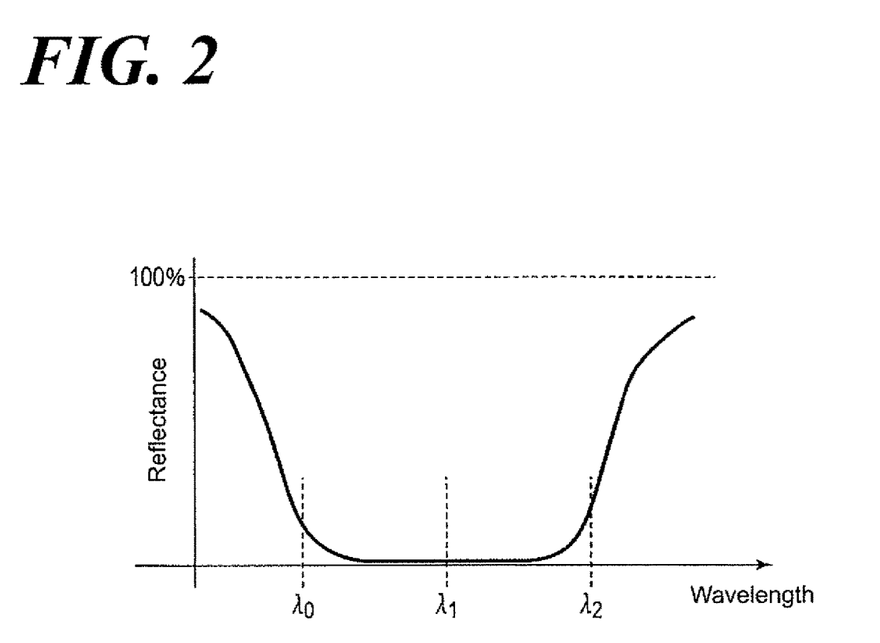
FIG. 2 is a graph illustrating a reflectance property relative to a wavelength of an anti-reflection coat treated on the end surface of a fiber according to the aspect of the Embodiment 1 of the present invention.

FIG. 2 is a graph illustrating a reflectance property relative to a wavelength of an anti-reflection coat 50 treated on the end surface of the fiber according to the aspect of the Embodiment 1 of the present invention. Referring to FIG. 2, the reflectance relative to the light of the first wavelength band (wavelength in the range of λ0 to λ2) of the semiconductor laser 2 is set as e.g., 0.2% and the reflectance relative to the light of the second wavelength band excluding the light of the first wavelength band is set as e.g., 90%.

The aiming light source 7 is applied to output the light of the second wavelength band to the optical fiber cable 6, being used to monitor the connection status of the optical fiber 6 or as a guide light (aiming light) depending on the wavelength.

The collimate lens 8 makes the lights of the second wavelength band from the aiming light source 7 parallel. The focus lens 4 converges the parallel lights from the collimate lens 8. The focus lens 4 makes the lights of the second wavelength band reflected on the anti-reflection coat 50, treated on the end surface of the optical fiber of the optical fiber cable 6, parallel.

The focus lens 9 converges the parallel lights from the focus lens 4 and outputs to the sensor 10. The sensor 10, corresponding to the detection element of the present invention, detects the connection status of the optical fiber cable 6 to the optical fiber connector 5 based on the light of the second wavelength band reflected from the anti-reflection coat 50 treated on the end surface of the optical cable 6 through the focus lens 9.

Next, referring to FIG. 1, the inventor sets forth an operation of the coupling module having such structure according to the aspect of the Embodiment 1.

Figure 3:
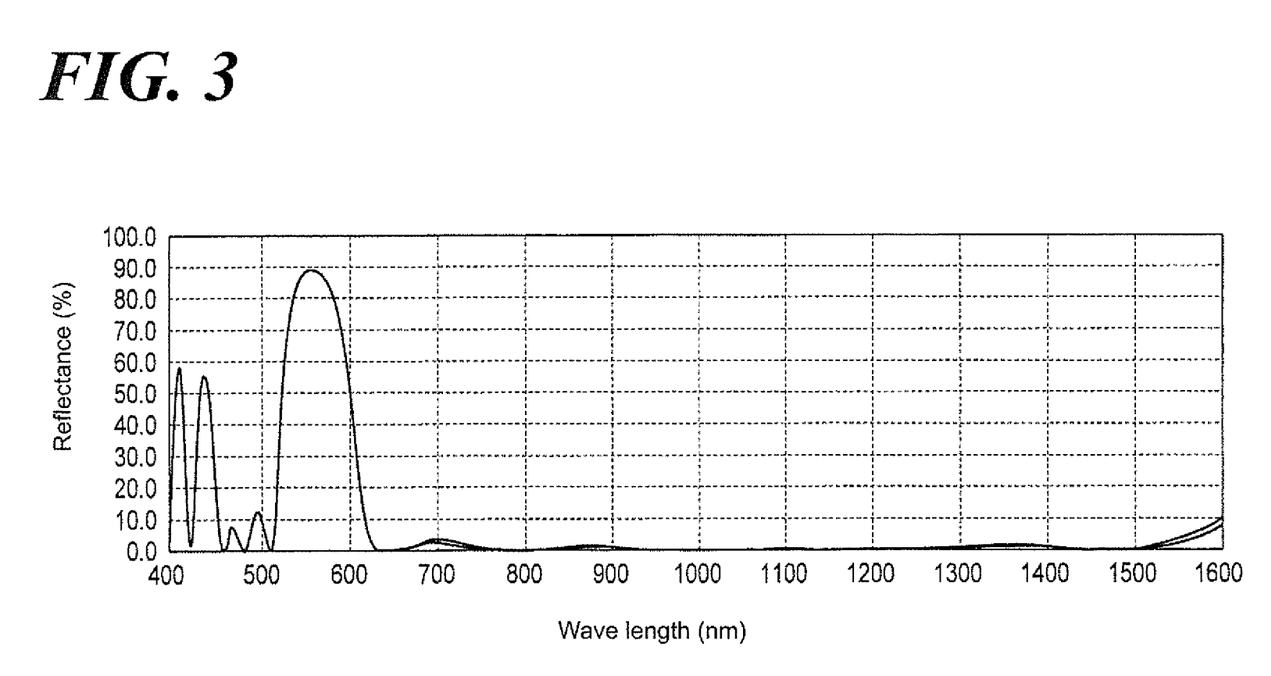
FIG. 3 is a graph illustrating the reflectance property relative to an actual broad band of the anti-reflection coat treated on the end surface of the fiber according to the aspect of the Embodiment 1 of the present invention.

Here, referring to FIG. 3, the actual reflectance of the anti-reflection coat 50, coated on the end surface of the fiber, relative to the wavelength is shown as-is. The first wavelength band of the semiconductor laser 2, i.e., the wavelength band connected to the optical fiber 6, is in the range of 630 nm to 1500 nm. The wavelength band used for connection monitoring of the optical fiber 6 is not shorter than 1500 nm or not longer than 630 nm.

First, the inventor sets forth the operation when the optical fiber cable 6 is connected to the optical fiber connector 5.

The laser light in the range of 630 nm to 1500 nm from the semiconductor laser 2 is output to the focus lens 4 through the collimate lens 3. The focus lens 4 converges the parallel lights in the range of 630 nm to 1500 nm from the collimate lens 3 and outputs to the end surface of the optical fiber 6. Then, almost all laser lights in the range of 630 nm to 1500 nm from the focus lens 4 are output to the optical fiber 6.

On the other hand, the light not shorter than 1500 nm and not longer than 630 nm from the aiming light source 7 is output to the focus lens 4 through the collimate lens 8. The focus lens 4 converges the light not shorter than 1500 nm and not longer than 630 nm from the collimate lens 8 and outputs to the end surface of the optical fiber 6.

Then, the anti-reflection coat 50, treated on the end surface of the optical fiber cable 6, reflects almost all lights not shorter than 1500 nm and not longer than 630 nm from the focus lens 4 and guides the reflected lights to the focus lens 4. Accordingly, the light not shorter than 1500 nm and not longer than 630 nm from the focus lens 4 is detected by the sensor 10 through the collimate lens 9.

Therefore, it can be detected by the detection value of the sensor 10 that the optical fiber cable 6 is connected to the optical fiber connector 5.

Next, when the optical fiber 6 is not yet connected to the light fiber connector 5, the connection is incomplete, or the end surface angle of the fiber is different from a normal condition, the light having a wavelength not shorter than 1500 nm not longer than 630 nm may not be guided to the sensor 10. Therefore, it can be discriminated that an unconnection error relative to the optical fiber cable 6 has taken place.

Accordingly, the connection state of the optical fiber 6 can be monitored inside the laser head, so that the operability thereof by a user is improved because e.g., a sensor is not required to be built outside the coupling module.

In addition, an anti-reflection coat 50 is treated on the end surface of the fiber, so that the shorter wavelength side and the longer wavelength side have a higher reflectance than the wavelength band (first wavelength band) having a low reflectance due to the anti-reflection coat 50 and consequently, the connection status of the optical fiber cable 6 can be monitored by using the aiming light source 7 having such wavelength band (second wavelength band).

In addition, if the longer wavelength side light source as the aiming light source 7 is used, the photon energy decreases, so that any damage and so forth at the end surface of the fiber can be suppressed and as a result, a system having a high reliability can be structured.

Further, a visible light source can be applied to the aiming light source 7. Further, referring to FIG. 4, when the laser light 23 is transmitted through a optical fiber core 22 comprising a core 22 and a clad 21, at least a part of the beam of the visible light source is set to be enclosed in the numerical aperture (NA) of the optical fiber cable and output to the emitting end of the optical cable. Accordingly, the aiming light source 7 can be used to monitor the connection status of the optical fiber cable 6 and also can be used as a laser light to determine a position for a laser machining, i.e., as a guide light.

Figure 4:
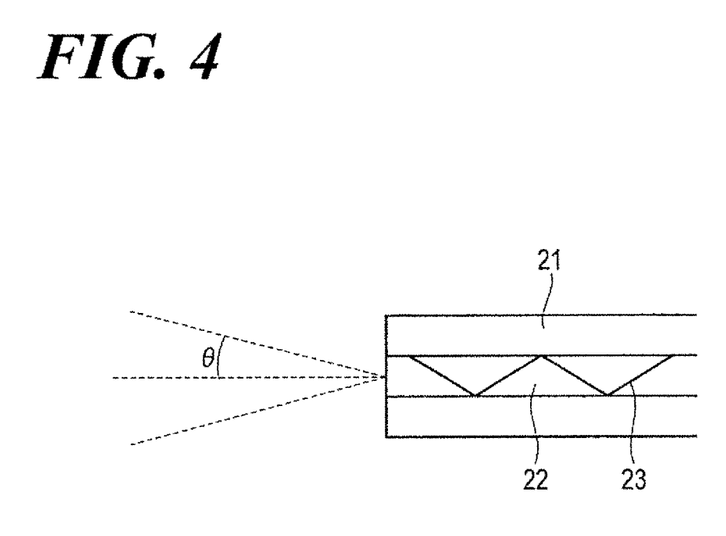
FIG. 4 is a diagram illustrating the numerical aperture (NA) of the fiber according to the aspect of the Embodiment 1 of the present invention.

Further, NA=sin θ holds and is in the range of 0.1 to 0.2. Referring to FIG. 4, θ is an angle between the incident beam and the center axis of the core 22 at the end surface of the optical fiber.

In such way, according to the fiber coupling module of the Embodiment 1, the light of the second wavelength band from the aiming light source 7 is reflected at the anti-reflection coat 50 by using the anti-reflection coat 50 treated on the end surface of the optical fiber cable 6 and the sensor 10 detects the connection status of the optical fiber cable 6 to the optical fiber connector 5 based on the light of the second wavelength band. Accordingly, the connection status of the optical fiber cable 6 is being monitored inside the fiber coupling module having the optical fiber connector 5.

Embodiment 2

When the main light source is e.g., a high-power laser and the size thereof becomes large, or when the laser module is made of a plurality of light sources, the aiming light source 7 or the sensor 10 is in-place hardly as illustrated in FIG.

Figure 5:
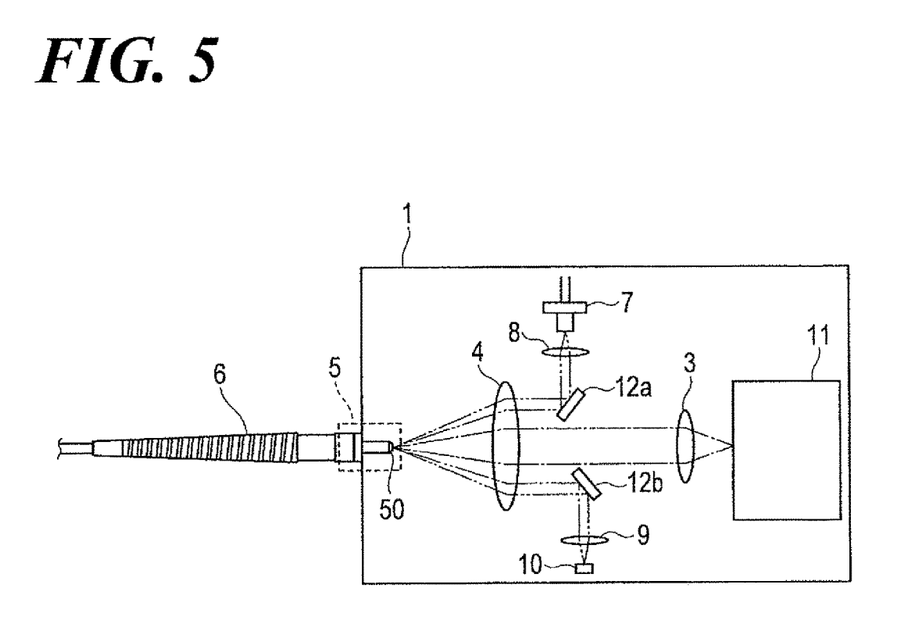
FIG. 5 is a diagram illustrating the structure of a fiber coupling module according to the aspect of the Embodiment 2 of the present invention.

Following the above, referring to FIG. 5, the fiber coupling module according to the aspect of the Embodiment 2, each aiming light source 7 and sensor 10 is in-place in the position other than the light axis of the beam emitted from the semiconductor laser 2 as the main light source so that the above problem can be resolved. Hereafter, the inventor sets forth the detail thereof.

According to the aspect of the Embodiment 2, a laser module 11 is used instead of the semiconductor laser 2. The collimator lens 3 and the focus lens 4 are in-place on the light axis of the laser module 11. The laser module 11 outputs the laser light to the focus lens 4 through the collimate lens 3.

Referring to FIG. 5, the aiming light source 7 and the collimate lens 8 are in-place in the position approximately 90° rotated counterclockwise from the position of the aiming light source 7 and the collimate lens 8 referring to FIG. 1. A dichroic mirror 12a tilted approximately 45 degree relative to the light axis of the aiming light source 7 is in-place between the collimate lens 8 and the focus lens 4.

Referring to FIG. 5, the sensor 10 and the focus lens 9 are in-place in the position approximately 900 rotated clockwise from the position of the sensor 10 and the focus lens 9 referring to FIG. 1. A dichroic mirror 12b tilted approximately 45 degree relative to the axis of the sensor 10 is in-place between the focus lens 9 and the focus lens 4.

According to the fiber coupling module of the Embodiment 2, having such structure, the beams from the aiming light source 7 changes the direction thereof by the dichroic mirrors 12a, 12b, so that no aiming light source 7 and no sensor 10 is in-place on the light axis of the laser module 11 and therefore, a space is reserved independently from the light axis of the laser module 11 so that the output beam and the monitoring system can be an independent system each other.

INDUSTRIAL APPLICABILITY

The present invention is applicable to a laser machining, a laser medical treatment and a laser measurement.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A fiber coupling module comprising:
   an optical fiber connector detachable from a optical fiber cable;
   an end surface of the optical fiber cable is treated with an anti-reflection coat to set a first reflectance lower than a predetermined value relative to a light of a first wavelength band and to set a second reflectance higher than a predetermined value relative to a light of a second wavelength band excluding said first wavelength band;
   said fiber coupling module connecting said optical fiber cable through said optical fiber connector;
   a main light source that outputs the light of said first wavelength band to said optical fiber cable;
   an aiming light source that outputs the light of said second wavelength band to said optical fiber cable; and
   a detection element detects a connection status of said optical fiber cable to said optical fiber connector based on the light of said second wavelength band reflected from said end surface of said optical fiber cable.

2. The fiber coupling module according to claim 1, wherein:
   said aiming light source is a light source providing a longer wavelength than said first wavelength band.

3. The fiber coupling module according to claim 2, wherein:
   said aiming light source is a visible light source and said visible light source outputs a beam to an emitting end of said optical fiber.

4. The fiber coupling module according to any one of claim 2, wherein:
   each of said aiming light source and said detection element is disposed at a position other than a light axis of a beam from said main light source.

5. The fiber coupling module according to claim 1, wherein:
   said aiming light source is a visible light source and said visible light source outputs a beam to an emitting end of said optical fiber.

6. The fiber coupling module according to claim 5, wherein:

at least a part of beam from said visible light source can be set within the scope of a numerical aperture of said optical fiber cable and is output to the emitting end of said optical fiber cable.

7. The fiber coupling module according to any one of claim 6, wherein:
each of said aiming light source and said detection element is disposed at a position other than a light axis of a beam from said main light source.

8. The fiber coupling module according to any one of claim 5, wherein:
each of said aiming light source and said detection element is disposed at a position other than a light axis of a beam from said main light source.

9. The fiber coupling module according to any one of claim 1, wherein:
each of said aiming light source and said detection element is disposed at a position other than a light axis of a beam from said main light source.

* * * * *